United States Patent
Kong et al.

(10) Patent No.: US 12,375,892 B2
(45) Date of Patent: Jul. 29, 2025

(54) DEVICE USING LOCAL SERVER FOR V2X SERVICE

(71) Applicant: LG ELECTRONICS INC., Seoul (KR)

(72) Inventors: Kwangsik Kong, Seoul (KR); Hakseong Kim, Seoul (KR); Donghwi Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 441 days.

(21) Appl. No.: 17/911,603

(22) PCT Filed: Jul. 28, 2020

(86) PCT No.: PCT/KR2020/009892
§ 371 (c)(1),
(2) Date: Sep. 14, 2022

(87) PCT Pub. No.: WO2022/025305
PCT Pub. Date: Feb. 3, 2022

(65) Prior Publication Data
US 2023/0117465 A1    Apr. 20, 2023

(51) Int. Cl.
*H04W 4/40*      (2018.01)
*H04W 4/02*      (2018.01)
(Continued)

(52) U.S. Cl.
CPC .............. *H04W 4/40* (2018.02); *H04W 4/021* (2013.01); *H04W 8/18* (2013.01)

(58) Field of Classification Search
CPC ......... H04W 4/40; H04W 4/021; H04W 8/18; H04W 4/44; H04W 4/46; H04W 4/02; H04W 88/18; H04W 8/06; H04W 4/50; H04W 88/08; H04W 88/00; H04W 76/00; H04W 76/10; H04W 76/11; H04W 4/029; H04W 4/21; H04W 8/065; H04W 8/082;
(Continued)

(56) References Cited

U.S. PATENT DOCUMENTS

| 11,140,529 B2 * | 10/2021 | Sabella ................. H04W 12/06 |
| 11,627,444 B2 * | 4/2023  | Ruan ................. H04W 36/0033 370/252 |

(Continued)

FOREIGN PATENT DOCUMENTS

| CN | 107424428 A | 12/2017 |
| CN | 107710795 A | 2/2018 |

(Continued)

OTHER PUBLICATIONS

Wang et al. (CN 107027104 A)—Method for Transmitting V2X Message, Gateway, Base Station, Device and Communication System (see title) (Year: 2017).*

(Continued)

*Primary Examiner* — Khawar Iqbal
(74) *Attorney, Agent, or Firm* — Birch, Stewart, Kolasch & Birch, LLP

(57) ABSTRACT

A device for a vehicle-to-everything (V2X) service selects a first local V2X server from multiple local V2X servers on the basis of current location. The device transmits a V2X service-related subscription request to the selected first local V2X server.

3 Claims, 9 Drawing Sheets

(51) Int. Cl.
*H04W 4/021* (2018.01)
*H04W 8/18* (2009.01)

(58) Field of Classification Search
CPC ......... H04W 8/12; H04W 88/02; H04W 4/23; H04L 67/1021; G08G 1/0116; G08G 1/0129; G08G 1/0141; G08G 1/164; G08G 1/0112; G08G 1/16; G08G 1/01; G08G 1/161
See application file for complete search history.

(56) References Cited

U.S. PATENT DOCUMENTS

| | | | |
|---|---|---|---|
| 12,047,986 B2* | 7/2024 | Sabella | H04W 36/0072 |
| 2002/0025781 A1* | 2/2002 | Saito | 455/41 |
| 2003/0050076 A1* | 3/2003 | Watanabe | 455/456 |
| 2013/0165075 A1* | 6/2013 | Rishy-Maharaj et al. | H04W 12/04 |
| 2017/0018187 A1 | 1/2017 | Kim et al. | |
| 2018/0049274 A1* | 2/2018 | Kim | H04W 84/005 |
| 2020/0178198 A1 | 6/2020 | Ding et al. | |
| 2020/0267784 A1* | 8/2020 | Bharatia et al. | H04W 76/12 |
| 2021/0281986 A1* | 9/2021 | Zhu | H04L 63/1425 |
| 2021/0289415 A1 | 9/2021 | Zhou et al. | |
| 2022/0116814 A1* | 4/2022 | Di Girolamo | H04L 65/80 |
| 2022/0191649 A1* | 6/2022 | El Essaili | H04L 67/51 |
| 2022/0329994 A1* | 10/2022 | El Essaili | H04L 67/12 |
| 2023/0069397 A1* | 3/2023 | El Essaili | H04L 41/5058 |
| 2023/0199445 A1* | 6/2023 | Kim | H04W 4/40 370/329 |
| 2024/0340853 A1* | 10/2024 | Park | H04L 5/0048 |

FOREIGN PATENT DOCUMENTS

| | | | |
|---|---|---|---|
| CN | 108140317 A | 6/2018 | |
| CN | 108513257 A | 9/2018 | |
| CN | 109644378 A | 4/2019 | |
| CN | 110784328 A | 2/2020 | |
| CN | 111263329 A | 6/2020 | |
| KR | 10-2017-0130428 A | 11/2017 | |
| KR | 10-2017-0134804 A | 12/2017 | |
| KR | 10-2018-0018454 A | 2/2018 | |
| KR | 10-2018-0021841 A | 3/2018 | |
| WO | WO 2016/152097 A1 | 9/2016 | |
| WO | WO 2016/197622 A1 | 12/2016 | |
| WO | WO 2017122976 A1 * | 7/2017 | ............ H04W 72/04 |
| WO | WO 2017/171297 A1 | 10/2017 | |
| WO | WO 2020/050440 A1 | 3/2020 | |
| WO | WO 2020/104405 A1 | 5/2020 | |

OTHER PUBLICATIONS

Wong et al. (WO 2017171806 A1)—V2X Server Discovery (see title) (Year: 2017).*

Ge et al. (CN 111385746 A)—The Invention Claims a Communication Method and Communication Device (see title) (Year: 2020).*

CN 109842854 A)—A Multicast Message, Message Broadcasting Method and Device (see title) (Year: 2019).*

CN 105407511 B)—A User Equipment Accesses a Carrier Aggregation Network of Method and Device (see title) (Year: 2018).*

* cited by examiner

FIG. 3
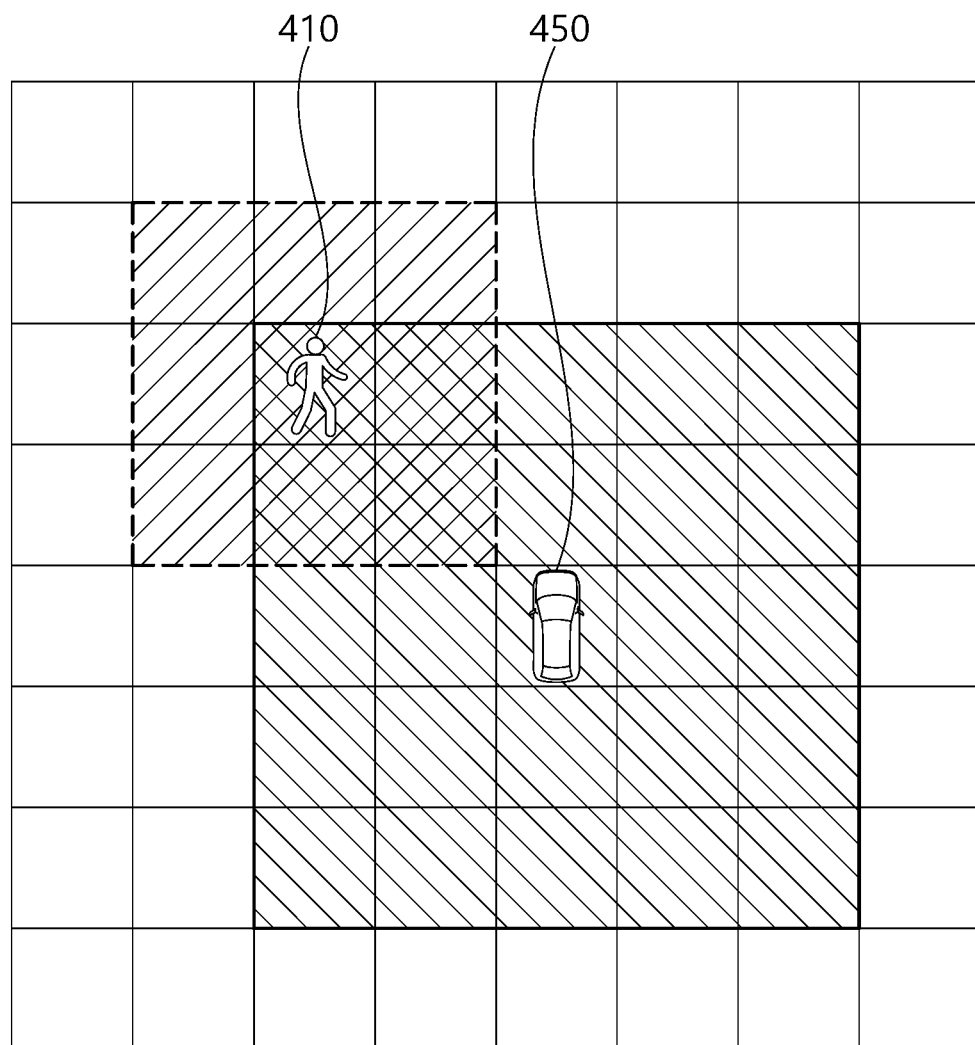
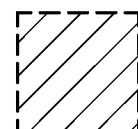 : First Subscription Area
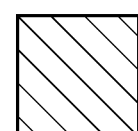 : Second Subscription Area

DEVICE USING LOCAL SERVER FOR V2X SERVICE

CROSS REFERENCE TO RELATED APPLICATION

This application is the National Phase of PCT International Application No. PCT/KR2020/009892, filed on Jul. 28, 2020, which is hereby expressly incorporated by reference into the present application.

BACKGROUND OF THE DISCLOSURE

Field

The present disclosure relates to a device for vehicle-to-everything (V2X) service.

Related Art

A vehicle is an apparatus which moves a passenger from one place to another place. A representative example is a car. A vehicle-to-everything (V2X) communication technology, which means vehicle-to-object communication, refers to a technology in which the vehicle communicates with other vehicles, pedestrians, road infrastructures, servers, and the like to provide a series of services.

For the V2X, standardization organizations such as Institute of Electrical and Electronics Engineers (IEEE), 3rd Generation Partnership Project (3GPP), etc. provide various communication specifications. Dedicated Short Range Communications (DSRC) is the communication standard protocol based on IEEE 802.11p. Cellular-V2X (C-V2X) is the communication standard protocol based on cellular communication protocol of 3GPP. In general, V2X has focused on vehicle safety through direct communication between vehicles, but recently V2X includes vehicle-to-infrastructure communication for communicating with peripheral devices via a network.

Attempts are being made to extend V2X technology to be applied to pedestrians and other electronic devices, rather than simply being used for vehicle safety, such as vehicle-to-vehicle and vehicle-to-peripheral devices.

SUMMARY OF THE DISCLOSURE

The present disclosure provides a device for vehicle-to-everything (V2X) service.

In an aspect, a device for vehicle-to-everything (V2X) service includes a processor, and a memory operatively coupled with the processor and configured to store instructions that, when executed by the processor, cause the server to perform functions. The functions includes receiving local server information about a plurality of local V2X servers from a global V2X server, selecting a first local V2X server among the plurality of local V2X servers based on a current location of the device, and transmitting a subscription request for V2X service to the first local V2X server.

In another aspect, a non-transitory computer-readable medium having computer-readable instructions stored thereon that are executable by a processor perform functions is provided. The functions include receiving local server information about a plurality of local V2X servers from a global V2X server, selecting a first local V2X server among the plurality of local V2X servers based on a current location of a V2X device, and transmitting a subscription request for V2X service to the first local V2X server.

In still another aspect, a server for vehicle-to-everything (V2X) service includes a processor, and a memory operatively coupled with the processor and configured to store instructions that, when executed by the processor, cause the server to perform functions. The functions include receiving a V2X message for requesting a configuration of a subscription area from a V2X device, and transmitting a message for requesting a register of an overlapped subscription area to a local server if the subscription area of the V2X device includes the overlapped subscription area which overlaps with a boundary area defined between a management area of the server and a management area of the local server.

It is possible to provide V2X services to more diverse users as well as vehicles.

BRIEF DESCRIPTION OF THE DRAWINGS

FIG. 3 shows an example in which a subscription area is set.

DETAILED DESCRIPTION OF THE EMBODIMENTS

Figure 1:
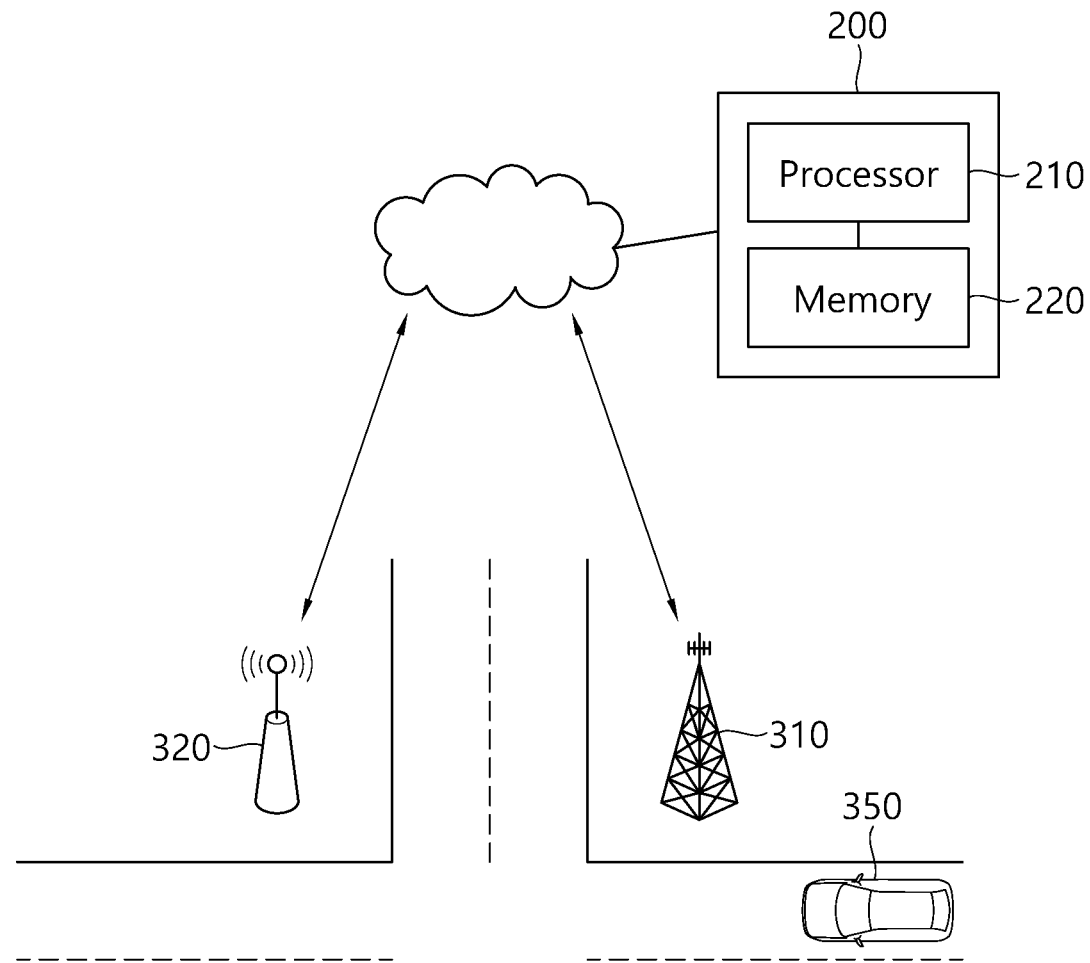
FIG. 1 shows a system to which an embodiment of the present specification is applied.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected"

or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be defined as a means of transport traveling on a road or track. Vehicles may include automobiles, ships, aircraft, trains, motorcycles, bicycles, and the like. The vehicle may include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification refers to a device that provides V2X functions and V2X services to users based on software, and is also referred to as a SoftV2X device. The V2X device may be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device may be mounted on a vehicle or electronic device as an on-board unit (OBU) to provide V2X functions and services to the vehicle. A V2X device disposed inside or outside the vehicle may be connected to the vehicle through a wireless interface to provide V2X functions and V2X services to the vehicle.

FIG. 1 shows a system to which an embodiment of the present specification is applied.

A system includes a V2X device 100 and a V2X server 200. The V2X device 100 may communicate with the V2X server 200 through the base station 310 or a Road Side Unit (RSU) 320. The V2X device 100 may communicate with the base station 310, the RSU 320, a neighbor vehicle 350 and/or a neighbor V2X device using a wireless communication protocol. There is no limitation on the wireless communication protocol. The wireless communication protocol may include Dedicated Short Range Communications (DSRC), Cellular-V2X (C-V2X), WiFi, BLUETOOTH and/or cellular communication protocols based on 3rd Generation Partnership Project (3GPP) (e.g. Wideband Code Division Multiple Access (WCDMA), Long Term Evolution (LTE), New Radio (NR), etc.).

The V2X server 200 receives one or more V2X messages from the V2X device 100 within a managed area. The V2X server 200 may forward the one or more collected V2X messages to the subscribing V2X device 100.

The V2X message may periodically or aperiodically be transmitted to the V2X server 200 by the V2X device 100 (or RSU 320), and is a message providing status information of the V2X device 100 (or device managed by the RSU 320). For example, the V2X device 100 may transmit 10 V2X messages per second. The V2X server 200 collects V2X messages from multiple V2X devices, and forwards the V2X messages to subscribing V2X devices.

The following table shows examples of information elements included in the V2X message. Not all information elements are required, and names are examples only. Information elements may be added/changed/deleted according to policies or circumstances.

TABLE 1

| Name | Description |
| --- | --- |
| V2X ID | A temporary identifier (ID) for identifying the V2X device sending this message. It is randomly selected by the V2X device and may be changed periodically. The size can be 4 octets. |
| Position | Indicates the location of the V2X device. May contain latitude, longitude and elevation. |
| Position Accuracy | Including the quality of various parameters used to model the accuracy of positioning. |
| Velocity | Indicates the velocity of the V2X device. |
| Heading | Indicates the current heading (direction of motion) of the V2X device. |
| Path History | defines a geometric path reflecting V2X device's movement over some period of time and/or distance |
| Acceleration | Indicates the acceleration of the V2X device. May include a set of acceleration values for three orthogonal directions of the V2X device: a longitudinal axis, a lateral axis, and a vertical axis. |
| Device Type | Indicates the type of V2X device. Example: pedestrian, automobile, bicycle, etc. |
| Publishing Area | To be described later |

The V2X message transmitted by the V2X device 100 to the V2X server 200 is called an uplink (UL) V2X message, and the V2X message transmitted by the V2X server 200 to the V2X device 100 is called a downlink (DL) V2X message.

The V2X device 100 may include a processor 110 and a memory 120. The processor 110 implements the functions of the V2X device 100 and may include one or more software modules. The V2X device 100 may further include various additional devices according to functions such as a display, a user interface, and a wireless modem.

The V2X server 200 is connected to one or more base stations 310 and/or RSU 320 and includes computing hardware that provides V2X functions and V2X services to the V2X device 100. The V2X server 200 may be a Mobile/Multi-access Edge Computing (MEC)-based server or a centralized-based server. The V2X server 200 may be called another name, such as a Geocast server or a SoftV2X server. The V2X server 200 may include a processor 210 and a memory 220. The processor 210 implements the function of the V2X server 200, and may include one or more software modules.

The processors 110 and 210 may include Application-Specific Integrated Circuits (ASICs), Central Processing Unit (CPU), Application Processor (AP), Digital Signal Processor (DSP), Digital Signal Processing Device (DSPD), Programmable Logic Device (PLD), Field Programmable Gate Array (FPGA), micro-controller, chipset, logic circuits, data processing device and/or combinations thereof. In the software implementation for the following embodiments, the software code for performing the functions described herein may be stored in the memories 120 and 220 and executed by the processors 110 and 210.

Memories 120 and 220 may store information accessible by processors 110 and 210. The information may include instructions executable by the processors 110 and 210 and/or data processed by the processor. Memories 120 and 220 may include any form of computer-readable medium operable to store information. For example, the memories 120 and 220 include read only memory (ROM), random access memory (RAM), digital video disc (DVD), optical disc, flash memory, solid state drive (SSD), hard drive and combinations thereof.

Message Queuing Telemetry Transport (MQTT) is used as a message queuing protocol between the V2X device 100 and the V2X server 200, but this is only an example. Advanced Message Queuing Protocol (AMQP), HyperText Transfer Protocol (HTTP), and/or vendor specific protocols may be used.

Now, setting an area for V2X service will be described in more detail. Hereinafter, a tile refers to a geographic basic unit for setting a subscription area. Hereinafter, a rectangle is shown in the form of a tile, but it is only an example. There are no restrictions on the shape of the tile, such as polygons or circles.

Figure 2:
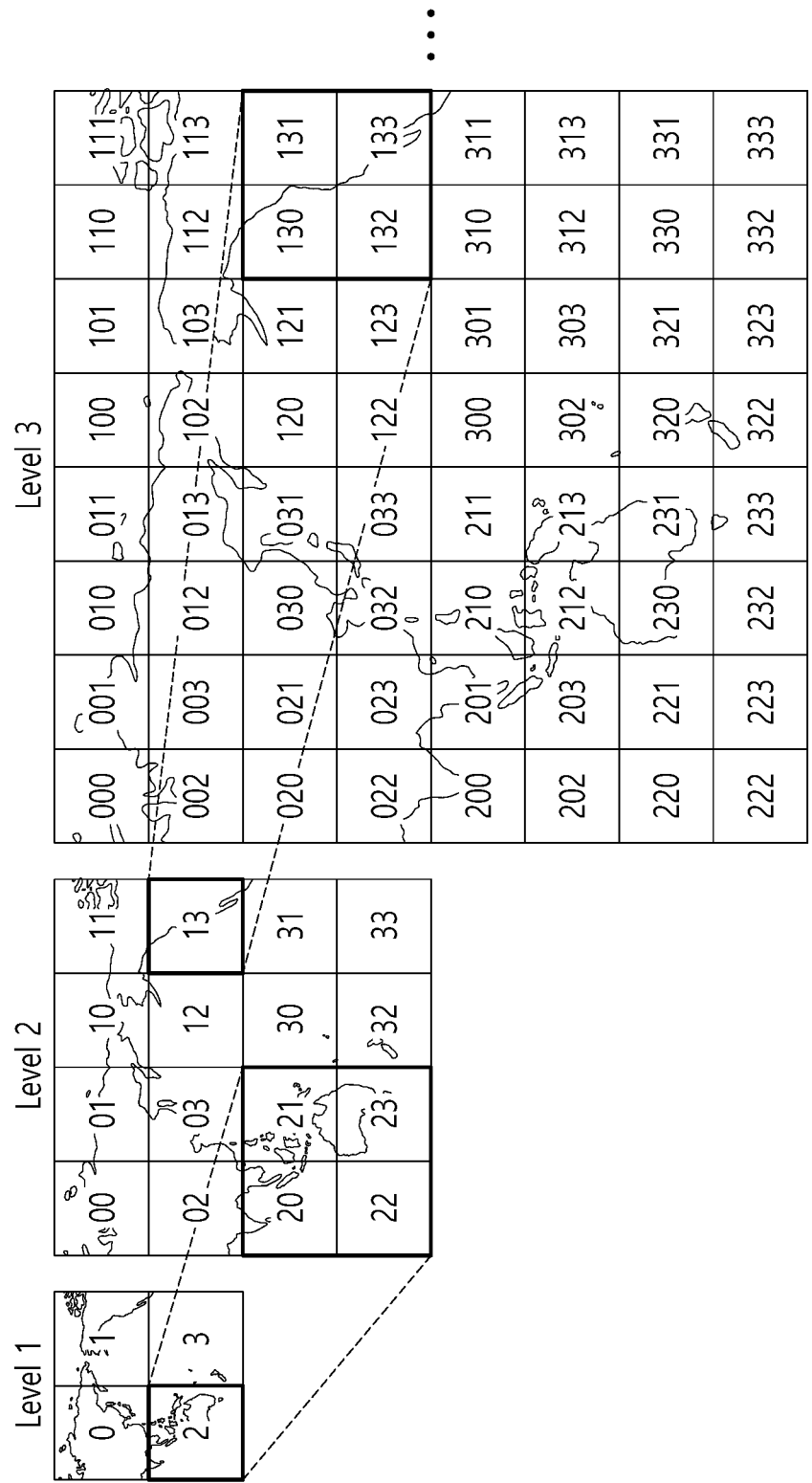
FIG. 2 shows an example of a tile using a quadtree.

FIG. 2 shows an example of a tile using a quadtree.

The quadtree represents a partition of space in two dimensions by decomposing a map (i.e. world map) into four equal quadrants, subquadrants, and so on. The size of a quadrant varies according to a zoom level, and each quadrant corresponds to a tile. Here, the case where the levels are 1, 2, and 3 is shown. The larger the level, the smaller the size of the tile. At each level, a unique ID is assigned to a tile. The tile ID may have the number of bits corresponding to the level.

The V2X device may acquire the ID of the tile in which it is located based on its location information (e.g. latitude and longitude). The V2X device and/or the V2X server may adjust the size of the area by adjusting the level according to the situation.

In the following embodiment, the area for the V2X service is defined as follows.

Management area: The area managed by the V2X server. The management area includes one or more tiles.

Subscription area: The area where the V2X device requests a subscription to the V2X server. The subscription area may be referred to as another name, such as a concerned area, an impact area, or a geocast area. The subscription area contains one or more tiles. The subscription area may be included in one management area, and may be defined across a plurality of management areas managed by a plurality of V2X servers.

Publishing area: The area where the V2X device publishes V2X messages to the V2X server. The publishing area may include one tile in each level. The publishing area may indicate a tile where the V2X device is currently located. Some or all of the publishing area may overlap with the subscription area.

FIG. 3 shows an example in which a subscription area is set.

A first subscription area is set to the first V2X device 410, and a second subscription area is set to the second V2X device 450. Each V2X device can set/change/delete the subscription area periodically or aperiodically (e.g. when its location is changed). Each V2X device can request setting/change/deletion of the subscription area to the V2X server.

The number of tiles included in the first subscription area is 9 and the number of tiles included in the second subscription area is 25, but the number of tiles included in the subscription area or the shape of the subscription area is not limited. The subscription area may include a tile in which the V2X device is located. Alternatively, the subscription area may include one or more tiles other than a tile in which the V2X device is located.

The first V2X device 410 may generate a first V2X message and periodically send the first V2X message to the V2X server. The second V2X device 450 may generate a second V2X message and periodically send the second V2X message to the V2X server.

The V2X server may forward one or more V2X messages received in or around a subscription area to the V2X device related to the subscription area.

A device that sets a subscription area may be referred to as a "subscriber device". A device that transmits a V2X message to a V2X server can be referred to as a "provider device". A V2X device may be a subscriber device, a provider device, or both a subscriber device and a provider device. The V2X server may forward the V2X messages transmitted by the provider devices in the management area to the subscriber device.

The V2X server may deliver the V2X message of a provider device "associated" to the subscription area of a subscriber device to the subscriber device. A provider device associated with a subscription area of a subscriber device may be referred to as a "subscribed provider device". The provider device associated with the subscription area of the subscriber device may satisfy at least one of the following conditions (i) to (iii): (i) Part or all of the publishing area of the provider device overlaps with the subscription area of the subscriber device. (ii) some or all of the subscription area of the provider device overlaps the subscription area of the subscriber device; and/or (iii) The location where the provider device transmits the V2X message is within the subscription area of the subscriber device.

According to condition (i) or (iii), the V2X server delivers V2X messages received in the first subscription area to the first V2X device 410. The V2X server delivers V2X messages received in the second subscription area to the second V2X device 450.

Since the first V2X device 410 is located in the second subscription area, the V2X server may forward the first V2X message to the second V2X device 450. The second V2X device 450 is a subscriber device, and the first V2X device 410 is a subscribed provider device.

Since the second V2X device 450 is not located in the first subscription area (which means that condition (i) or condition (iii) is not satisfied), the V2X server does not forward the second V2X message to the first V2X device 410. The second V2X device 450 is not a provider device of the first V2X device 410. If condition (ii) is considered, the second V2X device 450 may be a provider device of the first V2X device 410.

Figure 4:
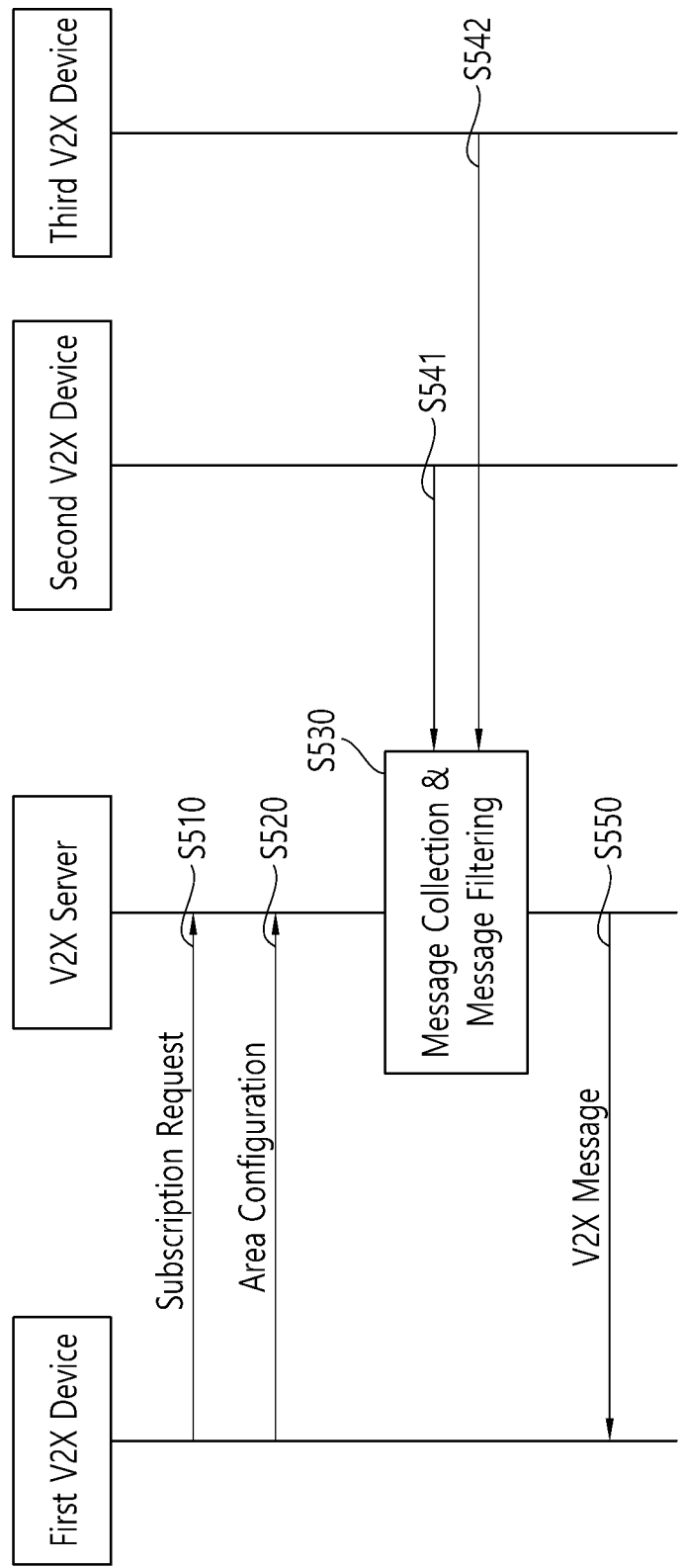
FIG. 4 is a flowchart illustrating a method for a V2X service according to an embodiment of the present specification.

FIG. 4 is a flowchart illustrating a method for a V2X service according to an embodiment of the present specification.

In step S510, a V2X device sends a subscription request for requesting subscription of the V2X service to a V2X server. The subscription request may include information about the identifier, location, etc. of the V2X device. The V2X server may transmit a subscription response for granting or rejecting subscription to the V2X device in response to the subscription request.

In step S520, the V2X device may send the area configuration related to the V2X service to the V2X server. The area configuration may be included in a separate message or included in the subscription request. The area configuration includes information about configuration and/or modification of the subscription area.

In step S530, the V2X server may collect V2X messages from V2X devices in the management area, and perform message filtering.

The V2X server receives the first V2X message from the second V2X device (step S541), and receives the second V2X message from the third V2X device (step S542). Assume that the second V2X device belongs to the subscription area of the first V2X device, but the third V2X device does not belong to the subscription area of the first V2X device.

In step S550, the V2X server publishes the first V2X message belonging to the subscription area of the first V2X device to the first V2X device. The first V2X device is a subscriber device and the second V2X device is a provider device. Since a V2X message of the third V2X device is not delivered to the first V2X device, the third V2X device is not a provider device of the first V2X device.

If there are a plurality of V2X messages to be sent to the first V2X device, the plurality of V2X messages may be published separately or as a single message.

Message filtering is that V2X server filters the V2X messages to be transmitted to V2X devices that have completed the subscription request. Message filtering may be referred to as a process of selecting a subscribed provider device associated with a subscriber device among a plurality of provider devices. Filtering conditions may be defined differently depending on the subscription area and/or the state of the V2X device. For example, if the number of V2X devices in the subscription area is large, the filtering conditions may be modified so that more messages are filtered out. Filtering condition may be related to the degree of risk of the V2X device.

While a vehicle travels at high speed, it is necessary to minimize the period at which the V2X message is transmitted so that it can be prepared for a dangerous situation. When the V2X server is connected through an IP network, the time required to transmit a message may extend, and the transmission delay may increase.

Figure 5:
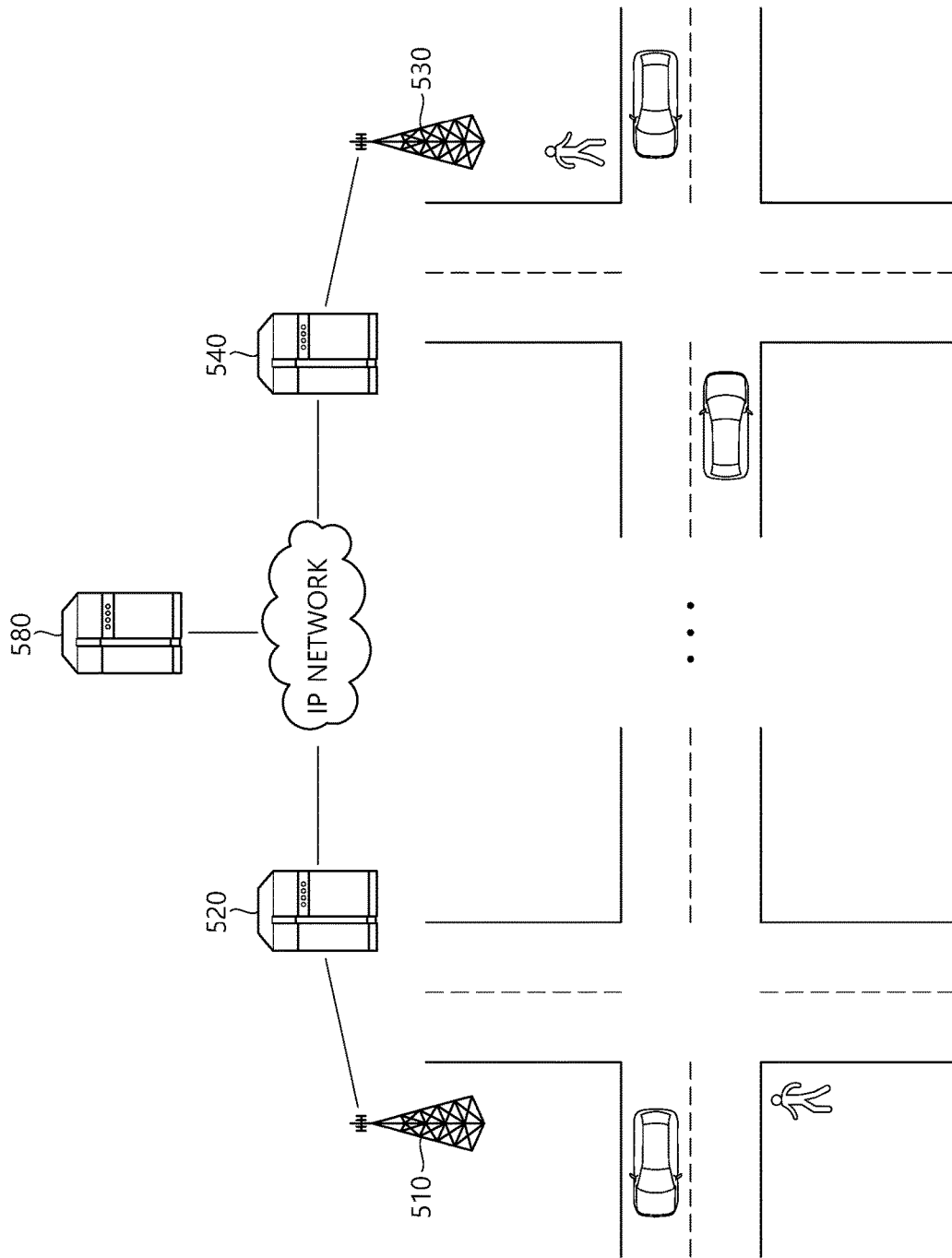
FIG. 5 shows a system for a V2X service according to an embodiment of the present specification.

FIG. 5 shows a system for a V2X service according to an embodiment of the present specification.

To implement a V2X server, local V2X servers 520 and 540 are used as edge computing, and a global V2X server 580 is used as a cloud server. Although it is shown that the two local V2X servers 520 and 540 are connected to the global V2X server 580 through an IP network, but there is no limit to the number of connected local V2X servers.

The global V2X server 580 manages the local V2X servers 520 and 540. The local V2X servers 520 and 540 may communicate directly with each other, or may communicate through the global V2X server 580. The global V2X server 580 may provide each V2X device with local server information on the local V2X server and information on the validity period of the local server information.

Each of the local V2X servers 520 and 540 has a management area, and provides V2X services to V2X devices in each management area. Each local V2X server may receive a V2X message from a V2X device in the management area. The first local V2X server may deliver the received V2X message to a first V2X device in its management area. The first local V2X server may forward the received V2X message to the second local V2X server. The first local V2X server may deliver the received V2X message to a second V2X device in the management area of the second local V2X server through the global V2X server 580.

The local V2X servers 520 and 540 may be deployed at the edge of the network, and here it is exemplarily shown that they are deployed around base stations 510 and 530. The 1:1 connection between the local V2X server and the base station is only an example. A plurality of local V2X servers may be deployed in one base station, or a single local V2X server may be deployed in a plurality of base stations.

The V2X device may receive information about local V2X servers from the global V2X server based on its current location. The V2X device may send a subscription request to the local V2X server and may register a subscription area. The V2X device may transmit its own V2X message to the local V2X server. The V2X device may receive the V2X message of surrounding V2X devices associated with the subscription area from the local V2X server.

Figure 6:
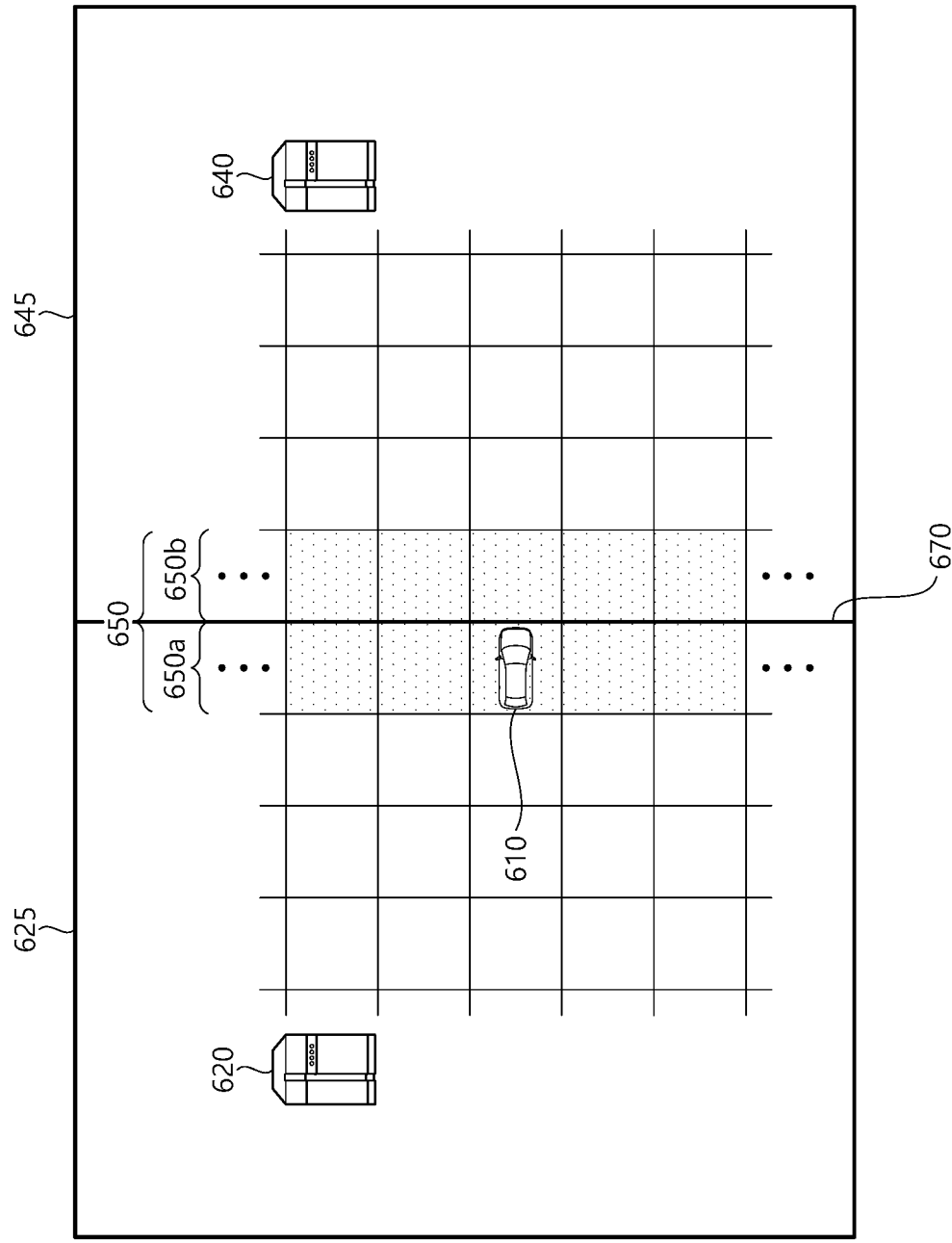
FIG. 6 shows an example in which a boundary area between two local V2X servers is defined.

FIG. 6 shows an example in which a boundary area between two local V2X servers is defined.

A first local V2X server 620 has a first management area 625, and a second local V2X server 640 has a second management area 645. A boundary 670 may be set between the two management areas 625 and 645. Here, it is shown that there is a rectangular management area and the boundary 670 is formed along one side, but the shape of the management area or the boundary is not limited.

A boundary area 650 is defined along the boundary 670. The boundary area 650 includes a first boundary area 650a belonging to the first management area 625 of the first local V2X server 620 and a second boundary area 650b belong to the second management area 645 of the second local V2X server 640. It is shown that each of the first boundary area 650a and the second boundary area 650b includes tiles which are adjacent to the boundary 670 and area arranged along the boundary 670, but this is only an example. Each of the first boundary area 650a and the second boundary area 650b may include tiles adjacent to the boundary 670.

All or part of the subscription area of the V2X device 610 may overlap with the boundary area 650. In this case, it is necessary to determine which local V2X server transmits a V2X message to the V2X device 610.

The V2X device 610 may be located in the boundary area 650. This may mean that the publishing area of the V2X device 610 overlaps the boundary area 650. It is necessary to determine which local V2X server receives a V2X message from the V2X device 610.

Hereinafter, the first local V2X server is a local V2X server in which the V2X device is located within the management area, also referred to as a serving local V2X server. The second local V2X server is a local V2X server having a boundary area with the first local V2X server, also referred to as a boundary local V2X server.

The V2X device may receive local server information about the first and second local V2X servers and validity period information from the global V2X server. The local server information may include information about the ID of the local V2X server, the management area and/or the boundary area of the local V2X server. The validity period information indicates a period during which the local V2X server information is valid. When the validity period expires, the V2X device may try to receive the local server information again from the global V2X server.

Figure 7:
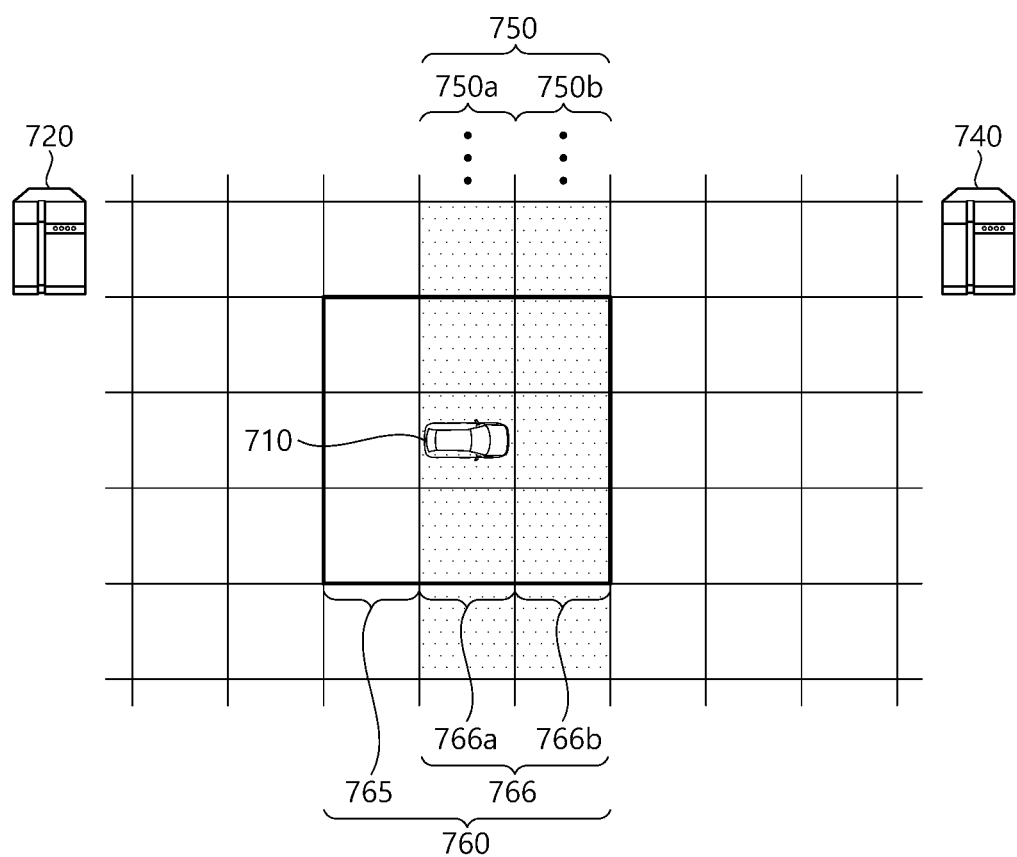
FIG. 7 shows an example in which a subscription area overlaps a boundary area.

FIG. 7 shows an example in which a subscription area overlaps a boundary area. When the subscription area overlaps the boundary area, a local V2X server in which the subscription area is registered is proposed.

There is a boundary area 750 between a first local V2X server 720 and a second local V2X server 740. Although the boundary area 750 is represented by a column of 2 tiles and a row of K (>1) tiles, this is only an example. The boundary area 750 may include a first boundary area 750a belonging to a first management area of the first local V2X server 720 and a second boundary area 750b belonging to a second management area of the second local V2X server 740.

A V2X device 710 may register a subscription area 760 to the first local V2X server 720 and/or the second local V2X server 740. Although the subscription area 760 is shown in a box shape of a 3×3 tile, this is only an example. The subscription area 760 may include a non-overlapped subscription area 765 belonging only to the management area of the first local V2X server and an overlapped subscription area 766 overlapping the boundary area 750. The overlapped subscription area 766 may include a first overlapped subscription area 766a and a second overlapped subscription area 766b as will be described later.

The following scheme is proposed in order to register the subscription area 760 with the first local V2X server 720 and/or the second local V2X server 740.

The first embodiment may be called as a first device driven scheme. The V2X device registers the non-overlapped subscription area 765 with the corresponding local V2X server. The V2X device divides the overlapped subscription area 766 into a first overlapped subscription area 766a and a second overlapped subscription area 766b, and registers each overlapped subscription area with the corresponding local V2X server. In this example, the V2X device registers the non-overlapped subscription area 765 with the first local V2X server 720. The V2X device registers the first overlapped subscription area 766a to the first local V2X server 720, and the second overlapped subscription area 766b to the second local V2X server 740. The V2X device may receive a V2X message associated with the non-overlapped subscription area 765 and the first overlapping subscription area 766a from the first local V2X server 720, and may receive a V2X message associated with the second overlapped subscription area 766b from the second local V2X server 740.

The second embodiment may be called as a second device-driven scheme. Compared with the first embodiment, the overlapped subscription area 766 is registered with both local V2X servers. In this example, the V2X device registers the non-overlapped subscription area 765 and the overlapped subscription area 766 to the first local V2X server 720. The V2X device also registers the overlapped subscription area 766 to the second local V2X server 740. This means that the V2X device receives a V2X message associated with the overlapped subscription area 766 from both the first local V2X server 720 and the second local V2X server 740.

The third embodiment may be called as a first server driven scheme. The V2X device requests the first local V2X server 720 to register the subscription area 760. The first local V2X server 720 may recognize that the overlapped subscription area 766 is included in the subscription area 760, and may divide the overlapped subscription area 766 into the first overlapped subscription area 766a and the second overlapped subscription area 766b. The first local V2X server 720 registers the non-overlapped subscription area 765 and the first overlapped subscription area 766a, and the second local V2X server 740 registers the second overlapped subscription area 766b. Now, the V2X device can receive, from the first local V2X server 720, a V2X message associated with the non-overlapped subscription area 765 and the first overlapped 766a, and can receive, from the second local V2X server 740, a V2X message associated with the second overlapped subscription area 766b.

The fourth embodiment may be called as a second server driven scheme. Compared with the third embodiment, in this way, both local V2X servers register the overlapped subscription area 766. The V2X device requests the first local V2X server 720 to register the subscription area 760. The first local V2X server 720 checks the overlapped subscription area 766 and requests the registration of the overlapped subscription area 766 to the second local V2X server 740. As a result, the first local V2X server 720 registers the non-overlapped subscription area 765 and the overlapped subscription area 766, and the second local V2X server 740 registers the overlapped subscription area 766.

Figure 8:
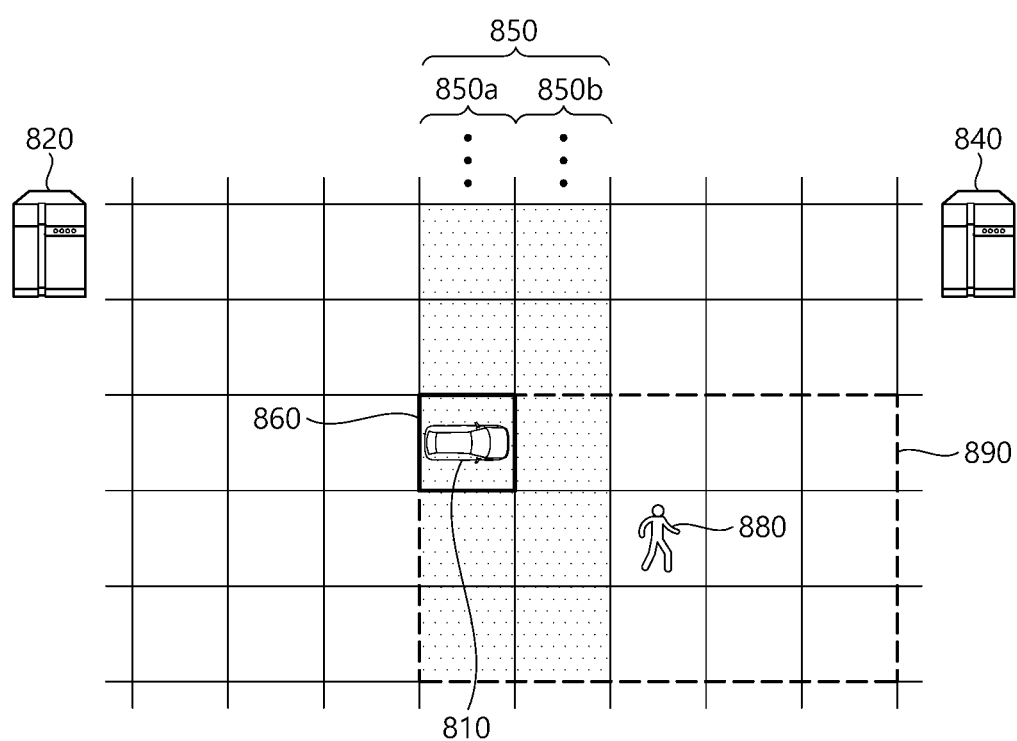
FIG. 8 shows an example in which the publishing area overlaps the boundary area.

FIG. 8 shows an example in which the publishing area overlaps the boundary area. When a publishing area overlaps with a boundary area, a local V2X server to receive the V2X message from the V2X device is proposed.

There is a boundary area 850 between a first local V2X server 820 and a second local V2X server 840. The boundary area 850 includes a first boundary area 850a belonging to a first management area of the first local V2X server 820 and a second boundary area 850b belonging to a second management area of the second local V2X server 840.

The V2X device 810 transmits a V2X message in the publishing area 860. When the publishing area 860 overlaps with the boundary area 850, it is proposed which local V2X server receives a V2X message transmitted by the V2X device 810.

The first embodiment may be called as a device-driven scheme. The V2X device transmits a V2X message to both the first local V2X server 820 and the second local V2X server 840. When the publishing area 810 overlaps with the boundary area 850, the V2X device may transmit a V2X message to all local V2X servers related to the boundary area 850. The second local V2X server 840 that has received the V2X message may forward the V2X message to a V2X device 880 having a subscription area 890 associated with the publishing area 810.

The second embodiment may be called as a first server-driven scheme. The V2X device may transmit a V2X message to the first local V2X server 820 or the second local V2X server 840. The first local V2X server 820 that has received the V2X message may deliver the V2X message to the second local V2X server 840 sharing the boundary area 850. The second local V2X server 840 that has received the V2X message may forward the V2X message to a V2X device 880 having a subscription area 890 associated with the publishing area 810.

The third embodiment may be called as second server driven scheme. The V2X device may transmits a V2X message to the first local V2X server 820. The first local V2X server 820 that has received the V2X message may forward the V2X message to a V2X device 880 having a subscription area overlapping the publishing area 860.

Figure 9:
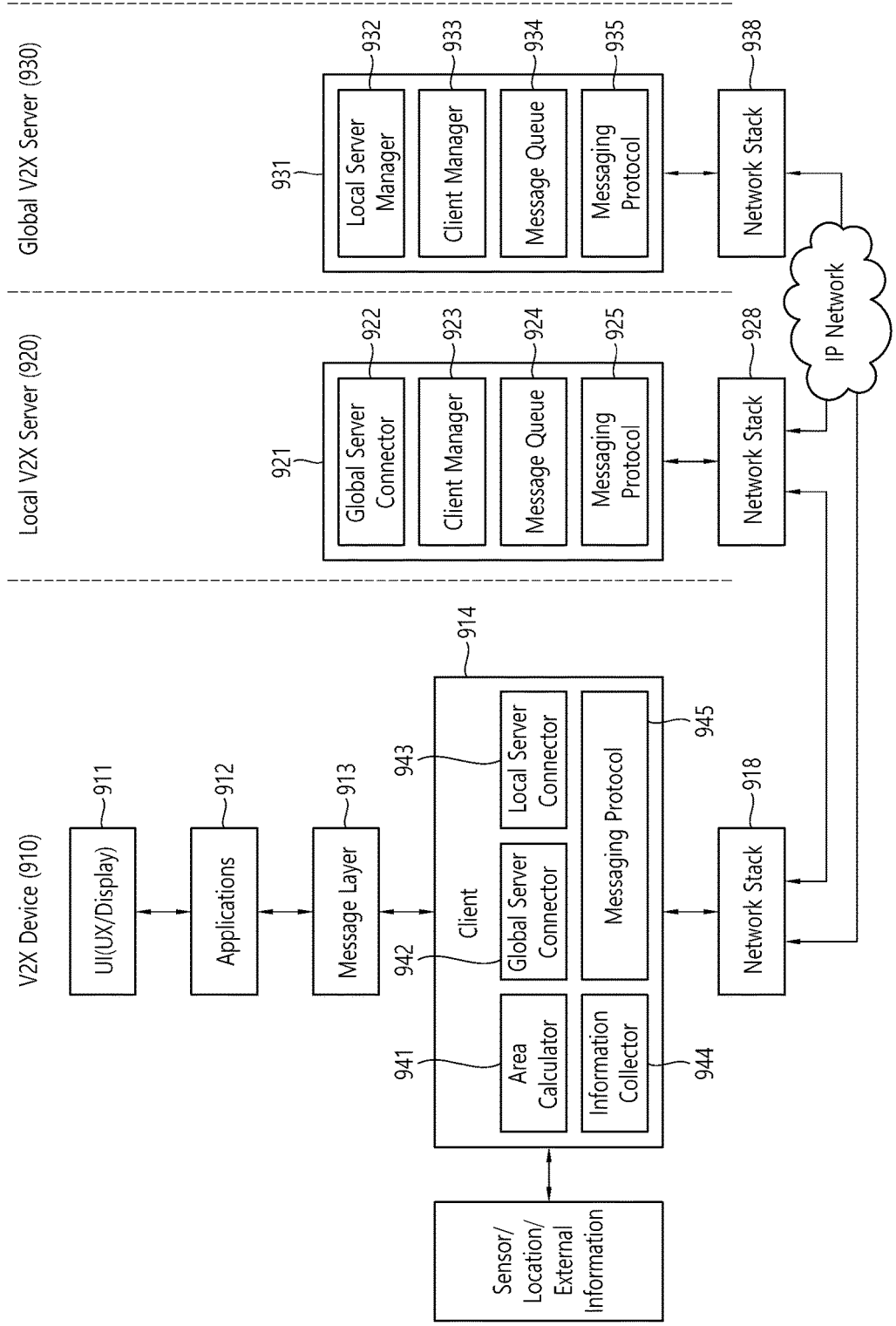
FIG. 9 shows an example of a system architecture of a V2X device and a V2X server.

FIG. 9 shows an example of a system architecture of a V2X device and a V2X server. Each module may be implemented in software, stored in a memory, and executed by a processor. Not all modules are required. Some modules may be omitted or modified, and more modules may be added. The name of each module is merely an example, not a limitation.

A V2X device 910 includes a user interface (UI) module 911, an application module 912, a message layer module 913, a client module 914, and a network stack module 918.

The UI module 911 may provide the user with a status of the V2X service, a warning, and the like, and receive a user input. The application module 912 may perform risk assessment using the received message. The message layer module 913 handles the sending/receiving of messages.

The client module 914 performs a client function to support the V2X service. The client module 914 includes a area calculator 941, a global server connector 942, a local server connector 943, an information collector 944, and a messaging protocol 945. The area calculator 941 determines the subscription area. The area calculator 941 may determine whether to change/add the subscription area according to the request of the V2X server. The area calculator 941 may determine whether to change/add the subscription area according to the state/risk level of the V2X device 910. The global server connector 942 is responsible for connection with the global V2X server 930. The local server connector 943 is responsible for connection with the local V2X server 920. The information collector 944 collects the location, sensor, and/or external information of the V2X device 910.

The local V2X server 920 includes a local server module 921 and a network stack module 928. The local server module 921 performs a server function to support the V2X function. The local server module 921 includes a global server connector 922, a client manager 923, a message queue 924, and a messaging protocol 925. The global server connector 922 is responsible for connection with the global V2X server 930. The client manager 923 manages a client connected to the local V2X server 920. The message queue 924 includes a queue for storing messages to be relayed to clients, and manages messages.

The global V2X server 930 includes a global server module 931 and a network stack module 938. The global server module 931 performs a server function to support the V2X function. The global server module 931 includes a local server connector 932, a client manager 933, a message queue 934, and a messaging protocol 935. The local server connector 932 is responsible for connection with the local V2X server 920. The client manager 933 manages clients connected to the global V2X server 930. The message queue 934 includes a queue for storing messages to be relayed to clients, and manages messages.

Messaging protocols 945, 925 and 935 implement various messaging protocols. Message Queuing Telemetry Transport (MQTT) is used as the messaging protocol, but this is only an example. Advanced Message Queuing Protocol (AMQP), HyperText Transfer Protocol (HTTP), and/or vendor specific protocols may be used.

The network stack modules 918, 928 and 938 implement various access layers for IP network interfaces such as transmission control protocol/internet protocol (TCP/IP), user datagram protocol/internet protocol (UDP/IP), and/or multi-access edge computing (MEC).

In the above examples, although the methods have been described based on the flowcharts using a series of the steps or blocks, the present disclosure is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present disclosure.

What is claimed is:

1. A device for vehicle-to-everything (V2X) service, the device comprising:
   a processor; and
   a memory operatively coupled with the processor and configured to store instructions that, when executed by the processor, cause the device to perform functions comprising:
   receiving local server information and validity period information from a global V2X server, wherein the local server information includes a first management area managed by a first local V2X server, a second management area managed by a second local V2X server, and a boundary area being defined between the first management area and the second management area, and the validity period information indicates a period during which the local server information is valid;
   when a publishing area where the device publishes a first V2X message carrying status information of the device overlaps with the boundary area, transmitting the first V2X message to both the first local V2X server and the second local V2X server so that each of the first local V2X server and the second local V2X server forwards the received first V2X message to another V2X device associated with the boundary area of a corresponding local V2X server;
   when a part or all of an overlapped subscription area of the device overlaps with the boundary area, registering the overlapped subscription area to both the first local V2X server and the second local V2X server for requesting the first local V2X server and the second local V2X server to send a second V2X message of a provider device associated with the overlapped subscription area, wherein the second V2X message is associated with the overlapped subscription area if the provider device transmitting the second V2X message is located within the overlapped subscription area; and
   receiving the second V2X message from at least one of the first local V2X server and the second local V2X server.

2. The device of claim 1, wherein the functions further comprise:
   receiving updated local server information from the global V2X server when the period indicated by the validity period information expires.

3. A method for vehicle-to-everything (V2X) service performed by a V2X device, the method comprising:
   receiving local server information and validity period information from a global V2X server, wherein the local server information includes a first management area managed by a first local V2X server, a second management area managed by a second local V2X server, and a boundary area being defined between the first management area and the second management area, and the validity period information indicates a period during which the local server information is valid;
   when a publishing area where the V2X device publishes a first V2X message carrying status information of the V2X device overlaps with the boundary area, transmitting the first V2X message to both the first local V2X server and the second local V2X server so that each of the first local V2X server and the second local V2X server forwards the received first V2X message to another V2X device associated with the boundary area of a corresponding local V2X server;

when a part or all of an overlapped subscription area of the V2X device overlaps with the boundary area, registering the overlapped subscription area to both the first local V2X server and the second local V2X server for requesting the first local V2X server and the second local V2X server to send a second V2X message of a provider device associated with the overlapped subscription area, wherein the second V2X message is associated with the overlapped subscription area if the provider device transmitting the second V2X message is located within the overlapped subscription area; and receiving the second V2X message from at least one of the first local V2X server and the second local V2X server.

* * * * *